Patented Dec. 16, 1941

2,266,603

UNITED STATES PATENT OFFICE 2,266,603

TREATMENT OF RUBBER

Louis H. Howland, Nutley, N. J., assignor, by mesne assignments, to United States Rubber Company, New York, N. Y., a corporation of New Jersey No Drawing. Application September 11, 1937, Serial No. 163,439

14 Claims. (Cl. 260—808)

This invention relates to the treatment of rubber and similar oxidizable materials, and more particularly to a new class of deterioration retarders.

An object of the invention is to provide a new class of anti-oxidants or age resistors for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, and the like. Further objects will be apparent from the following description.

According to the invention the organic substance is treated with a small proportion of an age resistor having the general formula

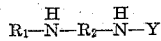

where $R_1$ is an aryl group; $R_2$ is an arylene group; and Y is a carbalkoxy group (substituted or unsubstituted). For the purposes of this invention, each of the materials of the class is referred to broadly as a carbalkoxy derivative of an amino-diarylamine, wherein the aforesaid carbalkoxy group is directly attached to the primary amino nitrogen atom of the amino diarylamine and wherein either or both of the aromatic nuclei may contain additional substituents.

By "an aryl group" herein is meant an aromatic hydrocarbon radical, whether further substituted or not in the nucleus, and having a free valence which belongs to the nucleus.

The materials may be prepared by any of the methods known in the art, for example, by the interaction of a primary-amino-substituted diarylamine and a chlorocarbonic ester (also known as a chloroformic ester).

The following examples are given to illustrate the invention and are not to be construed as limiting thereof (the parts are by weight):

Example 1

20 grams of p-amino-phenyl p-tolylamine dissolved in 150 cc. of alcohol are mixed while stirring with 145 grams of ethyl chlorocarbonate dissolved in 50 cc. of alcohol. This addition is followed immediately by the rapid addition of 15 grams of sodium acetate dissolved in 30 cc. water. The reaction mix is refluxed for 1½ hours, cooled and diluted with about one-half volume of water. The crystals separating may be purified by solution in acetic acid and reprecipitating by dilution with water. The product has a melting point of about 112° C. and is believed to have the formula:

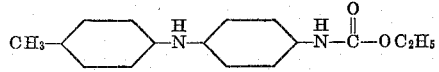

and may be called p-(p-tolylamino)-phenyl urethane.

A mix A containing 100 parts of pale crepe rubber, 3 parts of zinc oxide, 5 parts of titanium oxide, 3 parts of sulfur, 0.8 part of heptaldehyde-aniline was used as a base stock, and tested along with a similar mix B containing in addition 1 part of the product of Example 1. The samples were vulcanized in a mold for 30 minutes at 40 lbs./sq. in. steam pressure. The resulting stocks were aged 144 hours in the oxygen bomb at 300 lbs./sq. in. pressure at 60° C. and also in the Geer oven for 2 weeks at 158° F. Results were as follows, T representing tensiles in lbs./sq. in. at break and E being percent ultimate elongation.

| Cure | Stock A | | Stock B | |
|---|---|---|---|---|
| | T | E | T | E |
| Unaged: 30′ at 40#  | 3,350 | 730 | 3,599 | 760 |
| Aged 144 hrs. in oxygen: 30′ at 40# | Melted | | 1,917 | 650 |
| Aged 2 wks. at 158° F.: 30′ at 40# | 2,076 | 620 | 2,932 | 650 |

The scope of this invention covers the derivatives as described herein of primary-secondary aromatic amines among which are 4-amino diphenylamine; the 4-amino-phenyl toluidines; the 4-amino-phenyl xylidines; 4-amino-phenyl cumidines; 4-amino-4′-tertiary amyl diphenyl amine; 4-amino-4′-dodecyl diphenylamine; 4-amino-4′-hexadecyl diphenylamine; 4-amino-phenyl carvacryl amine; 4-amino-3-methyl diphenylamine; 4-amino-2-methyl-4′-tertiary butyl diphenylamine; 4-amino-phenyl phenetidine; 4-amino-4′-ethoxy-2′-methyl diphenylamine; 4-amino-2-ethyl-3′-propoxy diphenylamine; 4-amino-4′-dodecyloxy diphenylamine; 4-amino-4′-hexadecyloxy diphenylamine; 4-amino-4′-(butyl-mercapto)-diphenylamine; 4-amino-4′-(amyl-selenyl)-diphenylamine; 1-amino-4-phenylamino naphthalene and other amino arylamino naphthalenes; the 4-amino-phenyl naphthylamines; 4-amino-tolyl naphthylamines; N-(p-aminophenyl)-1-methyl-beta-naphthylamine; 4-amino-4′-toluidino diphenyl; 4-amino-4′-dimethylamino-diphenylamine; 4-amino-4′-diamylamino-diphenylamine; 4-amino-4′-morpholyl-diphenylamine; 4-amino-4′-piperidyl-diphenylamine; 4-amino-4′-dodecylamino-diphenylamine; 4-amino-4'-anilino-diphenylamine; 4-amino-4'-hydroxy-diphenylamine; N-(4-aminophenyl)-N'-(4-hydroxy-phenyl)-p-phenylene diamine; N-(4-amino-phenyl)-N'-(4-alkoxyphenyl)-p-phenylene diamine; N-(4-aminophenyl)-N'-(4-butyl-mercapto phenyl)-p-phenylenediamine; 4,4'-diamino-diphenylamine; N,N'-di-(4-amino-phenyl)-p-phenylene diamine; and the meta-amino-phenyl aryl amines.

Examples of carbalkoxy groups, representative of Y in the formula, and which may be substituted in any of the aforementioned amino diarylamines, include carbmethoxy, carbethoxy, carb-iso-propoxy, carb-tertiary-amyloxy, carb-dodecyloxy, carb-hexadecyloxy, carb-benzyloxy, carb-aryloxy such as carb-phenoxy and carb-naphthoxy, other groupings such as

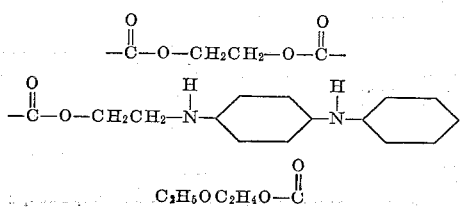

carb-furyloxy, carb-cyclohexyloxy, carb-beta-chlor-ethoxy, etc.

The various carbalkoxy derivatives may be used in conjunction with other types of anti-oxidants, for example, the ketone-diarylamine reaction products, such as acetone-diphenylamine, acetone-aniline, and their homologues and analogues.

The invention may be applied to the preservation of natural rubber compositions, as well as artificially-prepared rubber compositions, including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of preserving organic substances which tend to deteriorate by absorption of oxygen from the air which comprises incorporating therewith an anti-oxidant which is an N-carbalkoxy-para-amino-diarylamine.

2. A process of preserving organic substances which tend to deteriorate by absorption of oxygen from the air which comprises incorporating therewith an N-carbalkoxy-para-amino phenyl tolylamine.

3. A process of preserving organic substances which tend to deteriorate by absorption of oxygen from the air which comprises incorporating therewith an anti-oxidant which is a carbalkoxy-amino-diarylamine having the carbalkoxy group directly attached to the primary amino nitrogen atom of the amino diarylamine.

4. A process of preserving organic substances which tend to deteriorate by absorption of oxygen from the air which comprises incorporating therewith an anti-oxidant which is an N-carbethoxy-amino diarylamine.

5. A process of preserving organic substances which tend to deteriorate by absorption of oxygen from the air which comprises incorporating therewith an anti-oxidant which is an N-p-(p-arylamino) aryl urethane.

6. A process of preserving organic substances which tend to deteriorate by absorption of oxygen from the air which comprises incorporating therewith an N-p-(p-tolylamino) phenyl urethane.

7. A composition comprising rubber and an N-carbalkoxy-para-amino-diarylamine.

8. A composition comprising rubber and an N-carbalkoxy-para-amino phenyl tolylamine.

9. A composition comprising rubber and a carbalkoxy-amino-diarylamine having the carbalkoxy group directly attached to the primary amino nitrogen atom of the aminodiarylamine.

10. A composition comprising rubber and an N-carbethoxy-amino diarylamine.

11. A composition comprising rubber and an N-p-(p-arylamino) aryl urethane.

12. A composition comprising rubber and an N-p-(p-tolylamino) phenyl urethane.

13. A process of preserving organic substances which tend to deteriorate by absorption of oxygen from the air which comprises incorporating therewith an anti-oxidant having the general formula

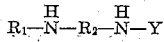

where $R_1$ is an aryl group; $R_2$ is an arylene group; and Y is a carbalkoxy group.

14. A composition comprising rubber and a compound having the formula

where $R_1$ is an aryl group; $R_2$ is an arylene group; and Y is a carbalkoxy group.

LOUIS H. HOWLAND.